(12) United States Patent
Trinick

(10) Patent No.: US 11,583,919 B2
(45) Date of Patent: Feb. 21, 2023

(54) RIVET INSERTION METHOD AND APPARATUS

(71) Applicant: Atlas Copco IAS UK Limited, Flintshire (GB)

(72) Inventor: Russell John Trinick, Flintshire (GB)

(73) Assignee: Atlas Copco IAS UK Limited, Flintshire (GB)

( * ) Notice: Subject to any disclaimer, the term of this patent is extended or adjusted under 35 U.S.C. 154(b) by 0 days.

(21) Appl. No.: 17/265,611

(22) PCT Filed: Aug. 5, 2019

(86) PCT No.: PCT/GB2019/052192
§ 371 (c)(1),
(2) Date: Feb. 3, 2021

(87) PCT Pub. No.: WO2020/025982
PCT Pub. Date: Feb. 6, 2020

(65) Prior Publication Data
US 2021/0299736 A1 Sep. 30, 2021

(30) Foreign Application Priority Data

Aug. 3, 2018 (GB) .................................. 1812641
Aug. 3, 2018 (GB) .................................. 1812665

(51) Int. Cl.
*B21J 15/02* (2006.01)
*B21J 15/36* (2006.01)

(52) U.S. Cl.
CPC ............. *B21J 15/025* (2013.01); *B21J 15/36* (2013.01)

(58) Field of Classification Search
CPC . B21J 15/025; B21J 15/36; B21J 15/10; B21J 15/02; B21J 15/285;
(Continued)

(56) References Cited

U.S. PATENT DOCUMENTS

| 5,752,305 A | 5/1998 | Cotterill et al. |
| 9,387,557 B2 | 7/2016 | Doo et al. |

(Continued)

FOREIGN PATENT DOCUMENTS

| DE | 405041 C | 10/1924 | |
| DE | 102016111616 A1 * | 12/2017 | ............. B21D 39/03 |

(Continued)

OTHER PUBLICATIONS

United Kingdom Intellectual Property Office Search Report for Application No. GB1812665.6 dated Jan. 17, 2019 (4 pages).
(Continued)

*Primary Examiner* — Jason L Vaughan
*Assistant Examiner* — Amanda Kreiling
(74) *Attorney, Agent, or Firm* — Michael Best & Friedrich LLP

(57) ABSTRACT

A method of inserting a rivet into a workpiece using a rivet insertion apparatus, the method comprising, during a first rivet insertion step, using a punch and die to drive the rivet into the workpiece such that a slug of workpiece material is removed from the workpiece and travels into a bore provided in the die, modifying or changing the die to provide a rivet receiving die surface, then during a second rivet insertion step, using the punch to drive the rivet further into the workpiece such that a shank of the rivet is upset by the rivet receiving die surface.

12 Claims, 11 Drawing Sheets

(58) Field of Classification Search
CPC ........... Y10T 29/49956; Y10T 29/5343; Y10T 29/5377; Y10T 29/49943
See application file for complete search history.

(56) References Cited

U.S. PATENT DOCUMENTS

| 10,654,094 | B2 * | 5/2020 | Skolaude | ............. B23P 19/006 |
| 2013/0205574 | A1 | 8/2013 | Doo et al. | |

FOREIGN PATENT DOCUMENTS

| DE | 102016111616 A1 | 12/2017 | | |
| EP | 2638987 A1 | 9/2013 | | |
| EP | 2829385 A1 | 1/2015 | | |
| JP | S5847349 U | 3/1983 | | |
| WO | 2017102668 A1 | 6/2017 | | |
| WO | WO-2017102668 A1 * | 6/2017 | ............. | B21J 15/28 |

OTHER PUBLICATIONS

International Search Report and Written Opinion for Application No. PCT/GB2019/052192 dated Dec. 17, 2019 (13 pages).
International Preliminary Report on Patentability for Application No. PCT/GB2019/052192 dated Feb. 9, 2021 (9 pages).

* cited by examiner

RIVET INSERTION METHOD AND APPARATUS

RELATED APPLICATION DATA

This application is a U.S. National phase application of International Application No. PCT/GB2019/052192 filed Aug. 5, 2019, which claims priority to Application Nos. GB 1812665.6 and GB 1812641.7 filed Aug. 3, 2018, the entire contents of each application are incorporated by reference herein.

The present invention relates to a method of inserting a rivet into a workpiece, and to an associated apparatus.

Self-piercing rivets are a well-established technology and are used, in combination with adhesives, to join metal workpieces together. Self-piercing rivets are used in the automotive industry to join aluminium vehicle panels together. Aluminium is particularly suited to joining using self-piercing rivets because it is relatively soft and relatively ductile. In a typical joint formed using a self-piercing rivet, a workpiece comprising two overlapping sheets of material is positioned over a suitably shaped die. A self-piercing rivet is inserted into the sheets of material. A shank of the rivet passes through the upper sheet of material and then flares outwardly as it travels into the lower sheet of material and approaches the die. Outward flaring of the shank may be referred to as upsetting the rivet. When the shank flares outwardly it extends into the lower sheet such that material of the lower sheet encapsulates the flared portion of the shank. This provides a secure engagement between the rivet and the lower sheet of material. The upper and lower sheets of material are securely held between a head of the rivet and the flared shank of the rivet, thereby forming a secure joint between the sheets of material. During rivet insertion the lower sheet material flows into the die and forms a so-called button (a raised disk) of material. Joining sheets of aluminium in this manner is efficient and effective, and is used extensively in the automotive industry during construction of aluminium bodied vehicles.

Although self-piercing rivets are very effective in joining relatively soft and ductile materials such as aluminium, they are less suited to joining less ductile material such as Ultra High Strength Steel (which may be considered to mean steel with a tensile strength of 800 MPa or more), magnesium, 7000 series aluminium, cast aluminium, and carbon fibre. The self-piercing rivet should fulfil two requirements in order to form a good joint, i.e. penetrating through the workpiece and flaring outwardly to provide engagement (also referred to as interlock) with a lowermost workpiece. It may be difficult to fulfil these requirements in less ductile materials because it is challenging to penetrate low ductility material and is also challenging to achieve sufficient flaring to provide interlock in a low ductility material without causing that material to crack.

One way of ensuring that a rivet can penetrate a low ductility material such as Ultra High Strength Steel (UHSS) without being damaged is to use a rivet with a very high hardness (e.g. a hardness of 530 HV or more). This allows the rivet to penetrate into the UHSS without collapsing. However, rivets with very high hardness are relatively brittle and often exhibit cracks when they have been inserted into a workpiece. This results in a joint which is relatively weak and may be prone to failure when the joint is subjected to a dynamic load (as may be experienced for example when a vehicle is moving).

It is an object of the present invention to provide a method and apparatus which overcomes a disadvantage associate with the prior art. The method and apparatus may be suitable for joining a workpiece which comprises UHSS, magnesium, 7000 series aluminium, cast aluminium, carbon fibre, or other low ductility material.

SUMMARY

According to a first aspect of the invention there as provided a method of inserting a rivet into a workpiece using a rivet insertion apparatus, the method comprising, during a first rivet insertion step, using a punch and die to drive the rivet into the workpiece such that a slug of workpiece material is removed from the workpiece and travels into a bore provided in the die, modifying or changing the die to provide a rivet receiving die surface, then during a second rivet insertion step, using the punch to drive the rivet further into the workpiece such that a shank of the rivet is upset by the rivet receiving die surface.

At the end of the second step, a head of the rivet may come to rest at a desired location with respect to an upper surface of the workpiece. For example, the head may be in contact with the upper surface of the workpiece.

Embodiments of the invention allow a workpiece to be pierced and then swaged in two separate operations, without requiring actuators capable of applying forces of the orders of tens of kNs to be provided on both sides of the workpiece.

The workpiece may be clamped to a die assembly by a nose of the rivet insertion apparatus throughout insertion of the rivet.

In some instances, after the first rivet insertion step, and before the second rivet insertion step, a bottom end of the shank of the rivet does not extend beyond the workpiece. The bottom end of the shank of the rivet may be substantially flush with a lowermost surface of the workpiece before the second rivet insertion step. In other instances the bottom end of the shank may extend beyond (e.g. slightly beyond) a lowermost surface of the workpiece.

Changing the die may comprise removing the die provided with the bore and replacing it with a die having the rivet receiving die surface.

Modifying the die may comprise removing an inner portion of the die and replacing it with a die inner portion which includes the rivet receiving die surface.

The rivet may include a feature partway along the shank of the rivet which increases engagement between the rivet and the workpiece such that force required to push the rivet into the workpiece increases when the feature comes into contact with the workpiece.

The rivet insertion apparatus may receive feedback indicating the position of the rivet, and may stop applying force when the first rivet insertion step has inserted the rivet to a desired position.

According to a second aspect of the invention there is provided a rivet insertion apparatus comprising a nose assembly, a punch, and a die assembly, wherein the die assembly comprises a die housing with a clamping surface configured to receive a workpiece which is clamped against the clamping surface by the nose assembly, and wherein the die assembly further comprises includes a die changing apparatus configured to swap between a die which includes a bore and a die which has a rivet receiving surface, or includes a die modifying apparatus configured to swap a die inner portion which comprises a die bore with a die inner portion which comprises a die receiving surface.

The die changing apparatus may comprise two dies held on pivoting supports which allow one die or the other die to be moved into a rivet receiving position in the die assembly.

The die modifying apparatus may comprise an axially moveable rod within which the die bore is provided, and may further comprise a removable die piece which comprises the rivet receiving surface, the removable die piece being movable to and from a position at one end of the axially moveable rod.

The die assembly may comprise a lock which is configured to hold the die or die inner portion in position.

The die assembly may further comprise an electric actuator or pneumatic actuator configured to move the dies or the die inner portions.

The rivet insertion apparatus may comprise a controller configured to receive feedback indicating the position of the rivet. The controller may be configured to stop force being applied to the rivet when the first rivet insertion step has inserted the rivet to a desired position.

According to a third aspect of the invention there is provided a rivet comprising a head and a cylindrical shank, wherein the rivet is provided with a plurality of ribs which extend from partway up the shank of the rivet to an underside of the head.

The ribs may taper outwardly as they extend towards the head.

According to a fourth aspect of the invention there is provided a rivet comprising a head and a cylindrical shank provided with a recess, wherein the shank comprises an upper portion and a lower portion, the upper portion having a larger diameter than the lower portion. The recess may have a depth which is less than the length of the lower portion of the shank.

A chamfered or curved transition may extends between the upper portion and the lower portion of the shank.

According to a fifth aspect of the invention there is provided a rivet comprising a head and a cylindrical shank, wherein the rivet is provided with a ridge which extends circumferentially around the shank.

The ridge may have a curved outer surface.

According to a sixth aspect of the invention there is provided a rivet comprising a head and a cylindrical shank, wherein the rivet is provided with a knurled band which extends around the rivet shank.

According to a seventh aspect of the invention there is provided a vehicle comprising a riveted joint formed using the method of the first aspect of the invention.

The advantages set out above in relation to the features of one of the aspects of the invention apply equally to other aspects of the invention having the same or equivalent features. The optional features set out above in relation to any one aspect of the invention may be combined with any of the other aspects of the invention.

Specific embodiments of the invention will now be described, by way of example only, with reference to the accompanying figures, in which:

DETAILED DESCRIPTION

Figure 1:
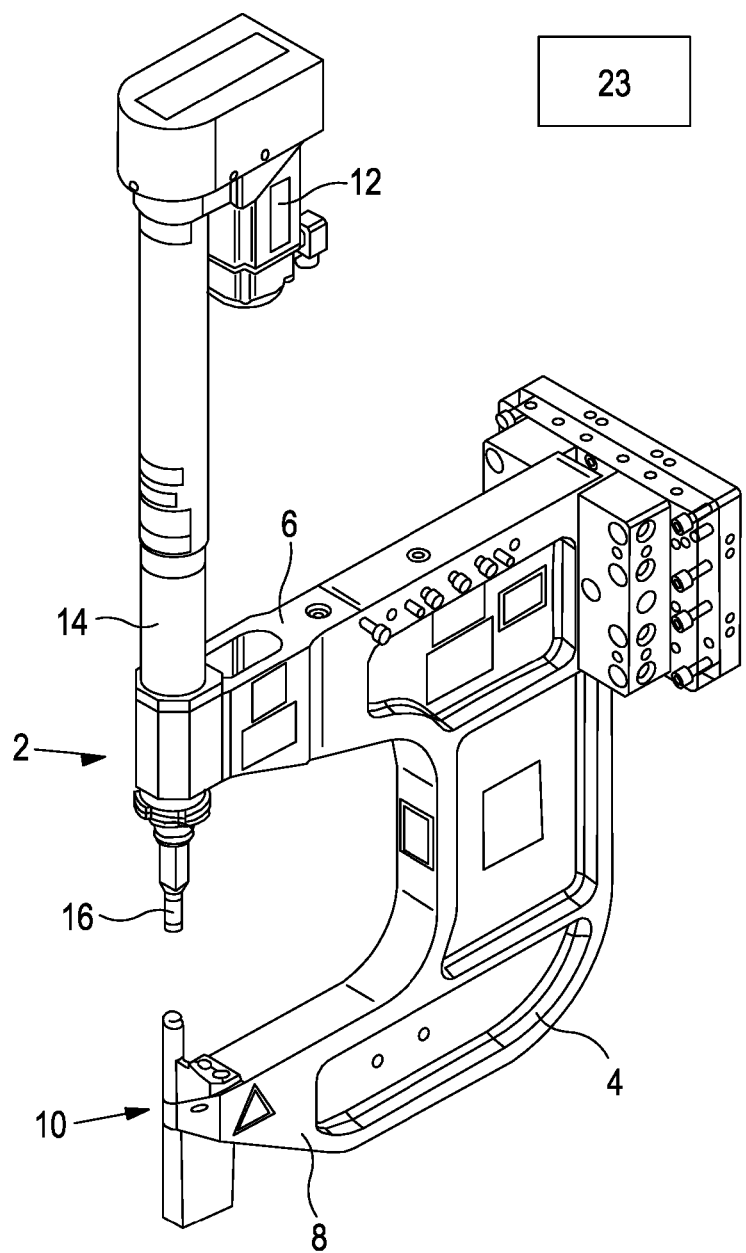
FIG. 1 is a perspective view of a rivet insertion apparatus according to an embodiment of the invention.

FIG. 1 shows a rivet insertion apparatus 2 and an associated carrier according to an embodiment of the invention. The carrier comprises a C-frame 4 which has an upper jaw 6 and a lower jaw 8. A die assembly 10 is provided on the lower jaw 8 of the C-frame. The rivet insertion apparatus 2 inserts rivets into a workpiece (not depicted) which is located over the die assembly 10, as described further below.

The rivet insertion apparatus 2 comprises an electric drive 12 that operates to drive an inertially driven reciprocal punch (hidden in FIG. 1) which moves axially in a cylindrical housing 14 and a nose assembly 16. Although an inertial electric drive is depicted, other forms of drive may be used. For example, the electric drive may comprise an electric motor which directly drives the punch (and which may be controlled based upon real-time feedback regarding the position of the punch). In another example a hydraulic drive may be used. However, an electric drive may be preferred because it does not require delivery of hydraulic fluid (delivering hydraulic fluid may be difficult, and the hydraulic fluid may pose a health and safety risk if it leaks). The reciprocal punch is used to insert rivets from the nose assembly 16 through a workpiece (not depicted). The rivet insertion apparatus 2 may further comprise an additional drive (not visible) which may be used to clamp the nose assembly 16 onto the workpiece during insertion of a rivet and during upsetting of the rivet (as described further below). The electric drive 12 and the additional drive may be independently controllable (e.g. using a control apparatus). The additional drive may for example be an electric drive or a hydraulic drive. An example of a drive which may be used to clamp the nose assembly 16 onto the workpiece is described in U.S. Pat. No. 5,752,305 which is herein incorporated by reference.

Rivets are supplied under air or gas pressure via a delivery tube (not shown) to the nose assembly 16. The rivets are then inserted through the workpiece. In an alternative arrangement, the rivets may be supplied by transportation to the nose assembly 16 in carrier tape (not depicted).

A control system 23 is configured to control delivery of rivets to the nose assembly 16, and is configured to control operation of the reciprocal punch. The control system 23 may also control other parts of the rivet insertion apparatus 2, such as the drive which moves the punch and the drive which moves the nose. The control system 23 may comprise a processor and a memory, the memory storing instructions regarding operation of the rivet insertion apparatus 2. The processor may process the instructions and provide outputs which control operation of the rivet insertion apparatus 2.

Figure 2:
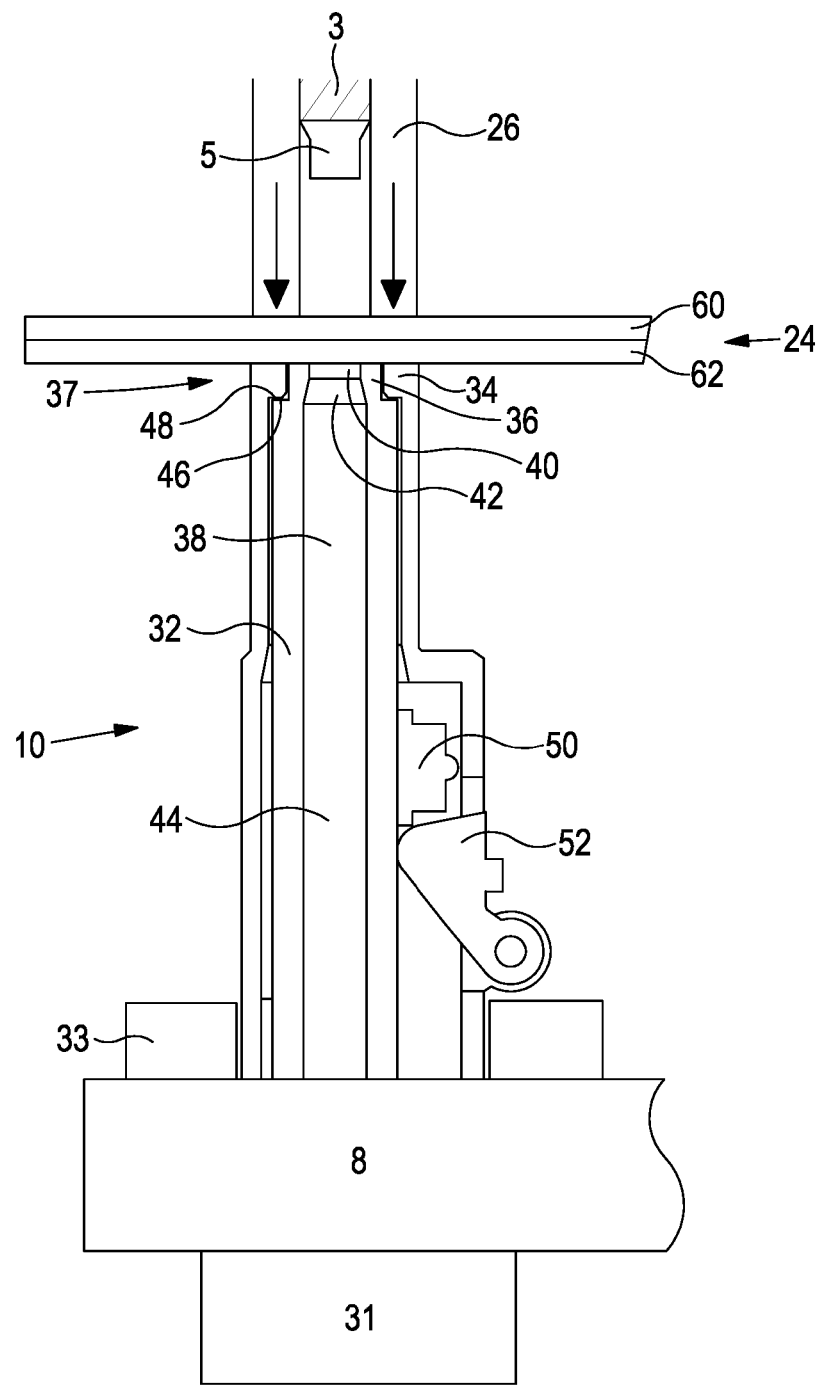
FIG. 2 is a cross-sectional view of a die assembly and nose which may form part of the rivet insertion apparatus of FIG. 1, together with a rivet and a workpiece.

FIG. 2 depicts in cross section a die assembly 10 according to an embodiment of the invention, together with a workpiece 24 and a nose 26 of a rivet insertion apparatus. The rivet insertion apparatus may correspond with the rivet insertion apparatus 2 depicted in FIG. 1 (with the nose 26 forming part of the nose assembly 16 depicted in FIG. 1). The die assembly comprises a housing 30 and a rod 32 which is moveable within the housing. The die assembly includes a base 33 which is attached to a lower jaw 8 of a C-frame (both schematically depicted). An actuator 31 (schematically depicted) moves the rod 32 in an axial direction within the housing 30. The actuator 31 may be electric. For reasons set out further below, the actuator 31 does not need to apply force of the size needed for rivet setting. Thus, an electric actuator may be used which is more compact than the inertial drive arrangement which is used to drive the punch. Other forms of actuator may be used. For example a pneumatic actuator may be used.

A lock (not depicted) locks the rod 32 in place when it is in the position depicted in FIG. 2, such that the rod cannot move axially. In one embodiment the lock is a pin which passes into an opening (e.g. a blind bore) formed in the rod 32. The opening may extend into the rod 32 in a direction which is transverse to the axial direction. An actuator (e.g. electric or pneumatic) may be used to move the pin into and out of engagement with the rod 32, thereby locking and unlocking the rod.

In an alternative lock, the rod 32 may be rotated (e.g. part-rotated) when it is moved to the position depicted in FIG. 2. The rod 32 may be provided with a pin which enters a slot in the housing 30 as it rotates. The slot may for example extend transverse to the axial direction, such that when the pin is located in the slot the rod 32 cannot move in the axial direction. When it is desired to move the rod 32 axially, the rod may be rotated such that the pin laves the slot, thereby allowing the rod 32 to move in the axial direction. More than one pin and associated slot may be provided. In an alternative arrangement, the rod 32 may be provided with a slot and the housing 30 may be provided with a pin.

The nose 26 of the rivet insertion tool 2 may be clamped to the workpiece 24 using a compression coil spring in a known manner. The compression coil spring (not depicted) is housed in the nose assembly 16 and biases the nose 26 downwards. When the C-frame 4 has been moved into position at the workpiece 24, the nose 26 advances to a set position. When the nose 26 is in the set position the coil spring applies a clamping force to the workpiece.

An upper end of the housing 30 forms an outer portion 34 of a die 37 of the die assembly 10, and an upper end of the rod 32 forms an inner portion 36 of the die. A bore 38 extends downwardly within the rod 32, beginning at the upper end of the rod. An upper end of the bore 38 provides a central opening of the die 37 formed by the die outer portion 34 and the die inner portion 36. The die 37 formed by the die outer portion 34 the die inner portion 36 and the bore 38 may be referred to as a piercing die 37 because it allows a rivet to pierce a hole through the workpiece 24.

The bore 38 in the rod 32 comprises a cylindrical upper portion 40, a tapered middle portion 42 and the lower cylindrical portion 44. The lower cylindrical portion 34 has a larger diameter than the upper cylindrical portion 40. This allows slugs of workpiece material to travel unimpeded down the lower cylindrical portion 44 of the bore 38 (as described further below). In an alternative embodiment (not depicted) an upper portion of the bore may taper outwardly (i.e. the upper portion of the die is not cylindrical).

An inward step 46 is provided adjacent to an upper end of the rod 32. A corresponding inward step 48 is provided in the housing 30. The steps 46, 48 are configured such that when the rod 32 is moved upwards within the housing 30 the steps determine the final positon of the rod with respect to the housing. The steps 46, 48 may for example be arranged such that when the steps are engaged with each other, an uppermost surface of the die outer portion 34 formed by the housing 30 is co-planar (or substantially co-planar) with an uppermost surface of the die inner portion 36 formed by the rod 32 (as depicted). The steps 46, 48 act together to form a hard stop which limits axial movement of the rod 32.

The die assembly 10 further comprises a removable die piece 50 and a pivoting arm 52. These are described in detail further below. The die assembly 10 is secured to a lower jaw 8 of a C-frame (e.g. as of the type depicted in FIG. 1).

In use, the rod 32 is initially positioned such that it engages against the housing 30 (the step 46 of the rod 32 engages with the step 48 of the housing). The die outer portion 34, the die inner portion 36 and the upper portion 40 of the bore 38 co-operate to form the die 37 with a planar (or substantially planar) uppermost surface. The C-frame 4 which holds the rivet insertion apparatus 2 (see FIG. 1) is manoeuvred such that the workpiece 24 is located between the die assembly 10 and the nose assembly 16 of the rivet insertion apparatus. In an embodiment the workpiece may comprise an upper layer 60 formed from Ultra High Strength Steel (UHSS), and may further comprise a lower layer of UHSS or some other material. The other material may also be low ductility, e.g. magnesium, 7000 series aluminium, cast aluminium, or carbon fibre. The nose 26 of the rivet insertion apparatus is moved towards the die 37, and the nose clamps the workpiece 24 between the nose and the die. A rivet 5 is provided to the nose. The punch 3 is used to drive the rivet into the workpiece 24.

Figure 3:
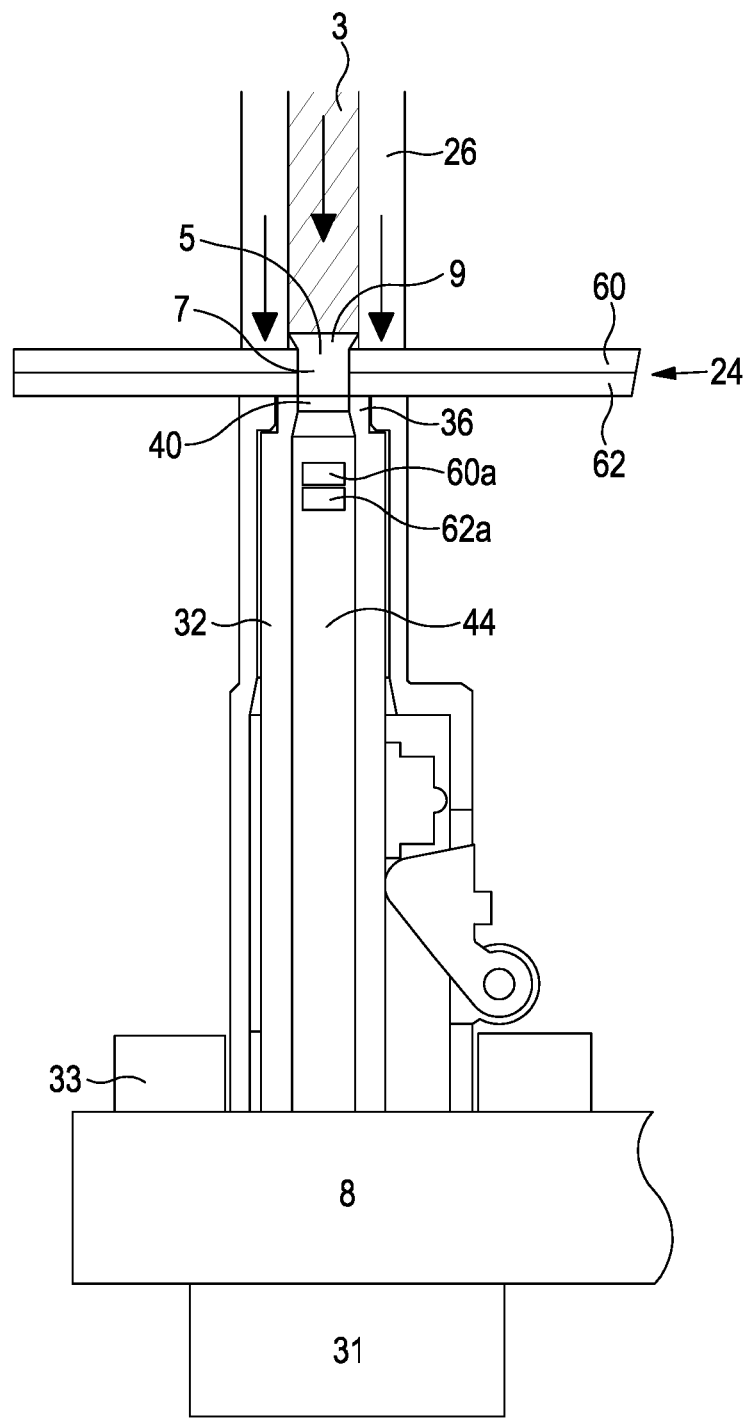
FIG. 3 is the same cross-sectional view as FIG. 2 but shows insertion of the rivet into the workpiece during a first rivet insertion step.

Referring to FIG. 3, the rivet 5 in combination with the die 37 cuts slugs 60a, 62a from the workpiece 24. The slugs 60a, 62a are pushed into the upper portion 40 of the bore 38, then travel through the outwardly tapering middle portion 42 of the bore. The slugs 60a, 62a then fall downwards through the lower cylindrical portion 44 of the bore 38. The cylindrical upper portion 40 of the die 37 has a diameter which is bigger than the diameter of the rivet shank 7 (e.g. has a diameter which is at least 0.1 mm bigger than the diameter of the rivet shank). The upper portion 40 of the bore 38 in combination with the shank 7 of the rivet determines the diameter of the slugs 60a, 62a which are cut from the workpiece 24. Since these diameters are smaller than the diameter of the lower cylindrical portion 44 of the bore 38, the slugs are able to travel easily and unimpeded down the lower cylindrical portion of the bore. FIG. 3 depicts the slugs 60a, 62a part way through their descent down the lower cylindrical portion 44 of the bore 38.

The diameter of the upper portion 40 of the bore 38 may for example be up to around 30% bigger than the diameter of the rivet shank 7 (measured prior to insertion of the rivet into the workpiece 24). When the diameter of the upper portion 40 of the bore 38 is significantly bigger than the diameter of the rivet shank 7 (e.g. 10% bigger or more), this will cause the hole cut into the workpiece by the rivet 5 to taper outwardly. That is, a lowermost end of the hole in the workpiece will have a larger diameter than an uppermost end of the hole in the workpiece. This advantageously provides a tapered space into which the rivet may be swaged outwardly during a subsequent step (described further below).

In FIG. 3, the rivet 5 has been inserted into the workpiece 24. However, no significant flaring of the shank 7 of the rivet 5 has taken place, and thus there is no significant interlock between the rivet and the lower layer 62 of the workpiece. Subsequent steps of the method provide this interlock. As will be appreciated from FIG. 3, the rivet 5 has not been driven fully into the workpiece 24. Instead, the rivet 5 has been driven partway into the workpiece 24. A bottom end of the shank 7 of the rivet 5 is substantially flush with a lowermost surface of the workpiece 24. In other embodiments the shank 7 may not be substantially flush with the lowermost surface of the workpiece 24. However, in all embodiments the rivet 5 at this stage has not been fully inserted into the workpiece 24 (i.e. a further rivet insertion step is yet to take place). In general, an upper surface of the rivet head 9 may for example be between 1 and 4 millimetres proud of the upper surface of the workpiece 24 after the first rivet insertion step.

Figure 4:
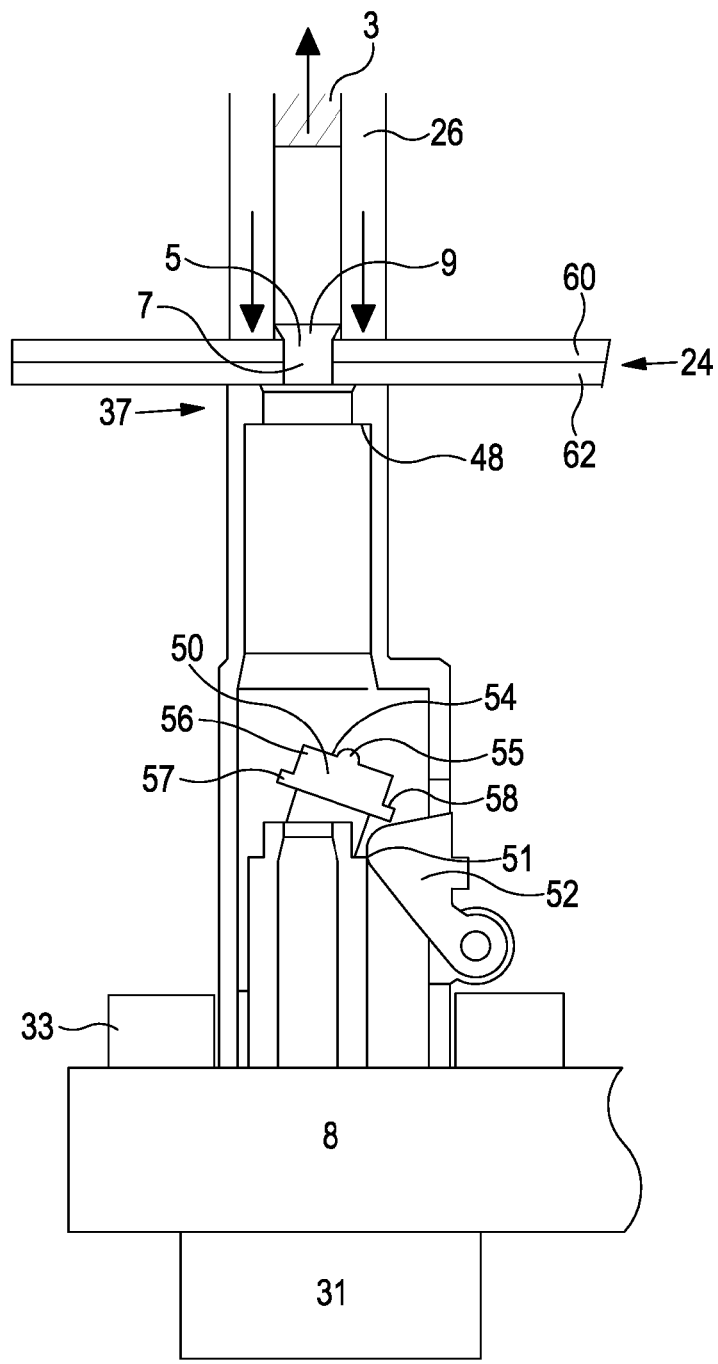
FIG. 4 is the same cross-sectional view, but depicts modifying the die of the die assembly.

The punch 3 is retracted away from the rivet 5, as depicted in FIG. 4. The rod 32 is retracted away from the rivet 5 and the workpiece 24. The nose 26 continues to clamp the workpiece 24 against the upper end of the housing 30. Although the die inner portion 36 has been removed from the workpiece 24 via retraction of the rod 32, the die outer portion 34 remains in place at the workpiece.

Figure 5:
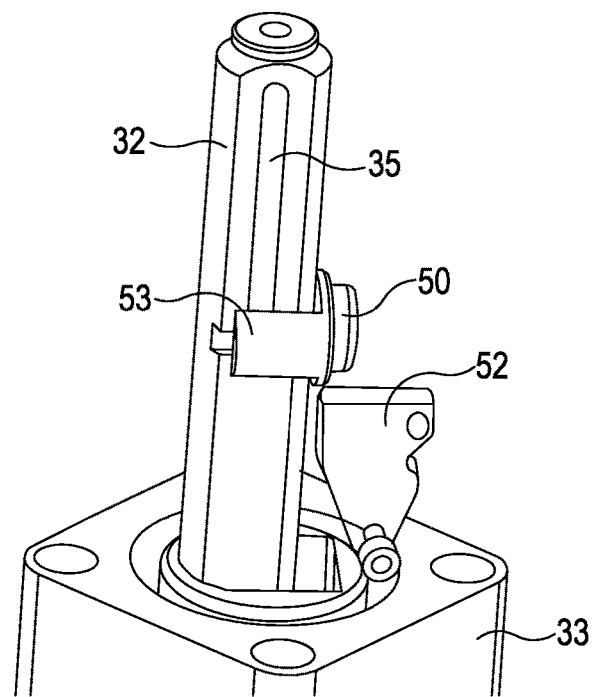
FIGS. 5 and 6 are perspective views of part of the die assembly which depict modifying the die in more detail.
Figure 6:
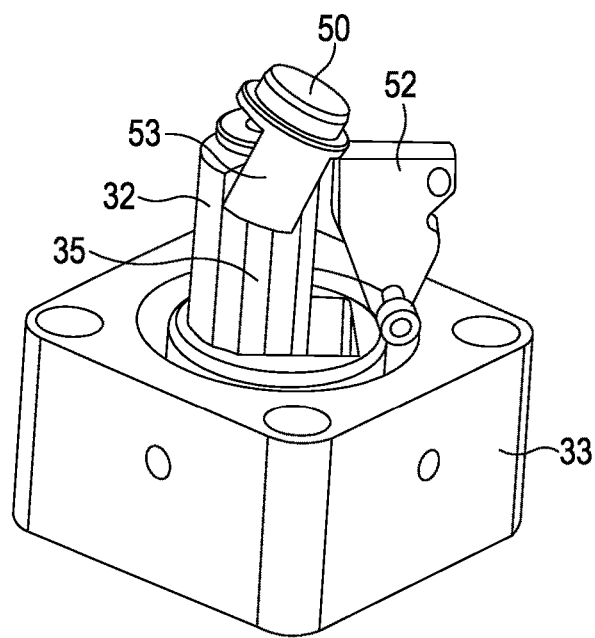

Retraction of the rod 32 from its initial position is also depicted in FIG. 5 and FIG. 6 (FIG. 5 depicts the rod in its initial position and FIG. 6 depicts the rod as it is being retracted). Referring first to FIG. 5, the rod 32, the removable die piece 50, the pivoting arm 52, and the base 33 are all depicted in a perspective view. The rod 32 includes a slot 35 which is recessed into the rod 32 and which extends partway along the rod. A corresponding slot (not visible) is provided on an opposite side of the rod. The removable die piece 50 includes arms 53 provided with pins (not visible) which are received in the slots 35. The slots 35 allow the removable die piece 50 to move up and down along the rod 32.

When the rod is retracted the removable die piece 50 initially moves with the rod 32. As a result of this movement the removable die piece 50 comes into contact with a shoulder 51 of the pivoting arm 52. The shoulder 51 of the pivoting arm 52 prevents further downwards motion of the removable die piece 50. Consequently, as the rod 32 continues to move downwards the removable die piece 50 moves upwards along the slots 35 in the rod 32. This movement continues until the removable die piece 50 reaches the top of the slots 35. Further downwards movement of the rod 32 then causes the removable die piece 50 to be rotated about the pins on the arms 53, as depicted in FIGS. 4 and 6. The rotation of the removable die piece 50 continues until the removable die piece sits on the upper end of the rod.

Figure 7:
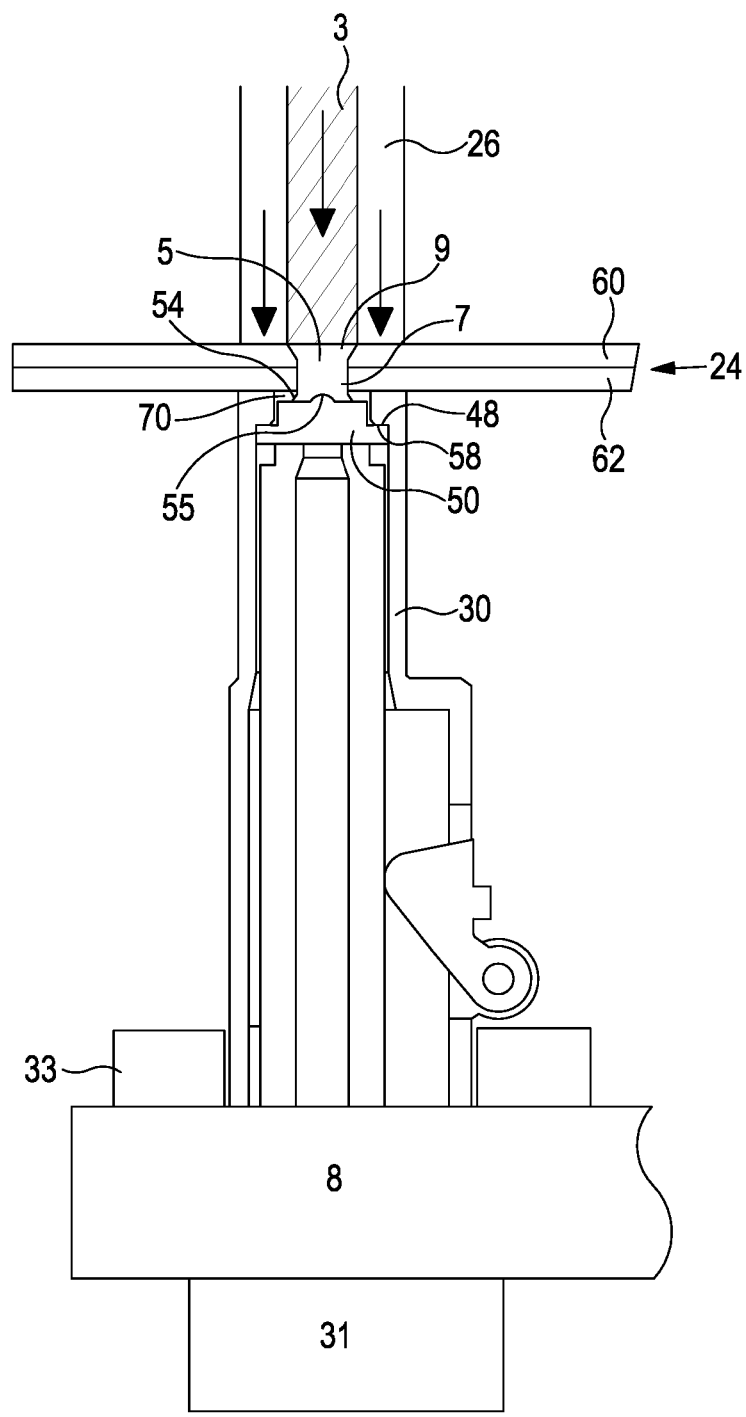
FIG. 7 is the same cross-sectional view as FIGS. 2 to 4, but shows further insertion of the rivet into the workpiece and swaging of the rivet shank during a second rivet insertion step.

Referring to FIG. 7, the rod 32 is been retracted sufficiently far that the removable die piece 50 is pushed by the shoulder 51 of the pivoting arm 52 until it is located squarely over the end of the rod. The rod is then moved upwards and back towards the rivet 5 and workpiece 24. The removable die piece 50 comprises a rivet receiving die surface 54. The rivet receiving die surface 54 may include a protrusion 55 (which may be referred to as a pip) at its centre. In other embodiments the rivet receiving die surface 54 may be substantially flat. The removable die piece 50 further comprises an upper portion 56 and a lower portion 57. The lower portion 57 is wider than the upper portion 56, and there is a step 58 between the upper portion and the lower portion. This step 58 is configured to engage with the step 48 in the die assembly housing 30. Engagement between the steps 48, 58 prevents further upward movement of the rod 32 and removable die piece 51.

FIG. 7 The rod 32 has been moved upwards until the step 58 of the removable die piece 50 engages with the step 48 of the housing 30 of the die assembly 10. The separation between the step 58 and the rivet receiving die surface 54 of the removable die piece 50 (excluding the pip 55) is smaller than the separation between the step 48 and the uppermost surface of the housing 30. Consequently, the rivet receiving die surface 54 is not co-planar with the outer die portion 34. The removable die piece 50 does not come into contact with the workpiece 24, and instead, there is a gap 70 between the rivet receiving die surface 54 and the workpiece 24. The die outer portion 34 and the rivet receiving die surface 54 together form a die 39 which may be used to upset the shank 7 of the rivet. This may be referred to as swaging, and the die 39 may be referred to as a swaging die 39.

The step 48 of the housing 30 and the step 58 of the removable die piece 50 act together to form a hard stop which limits axial movement of the rod 32. The separation between the rivet receiving die surface 54 (excluding the pip 55) and an upper surface of the outer die portion 34 formed by the housing 30 may for example be around 1.5 mm (e.g. plus or minus 0.5 mm) This separation may correspond with the height of the pip 55 which projects from the rivet receiving die surface 54. The size of the separation between the rivet receiving die surface 54 and the upper surface of the outer die portion 34 determines the length of rivet shank 7 which extends from the workpiece following the swaging step (i.e. when the joint has been completed). In an embodiment (not depicted), the rivet receiving die surface 54 may be substantially flush with the upper surface of the outer die portion 34, in which case the rivet shank 7 may be substantially flush with a lowermost surface of the workpiece 24 when the joint has been completed. In general, the separation between the rivet receiving die surface 54 (excluding the pip 55) and the upper surface of the outer die portion 34 may be up to 2 mm or up to 3 mm (or there may be no separation as noted above).

Once the rod 32 is in position, with the step 58 of the removable die piece engaged with the step 48 of the housing 30, the punch 3 is moved downwards such that it once again drives the rivet 5 downwards. This second rivet insertion step pushes the rivet 5 further downwards such that a head 9 of the rivet is pressed into the upper layer 60 of the workpiece 24. At the same time, a bottom end of the shank 7 is pressed against the rivet receiving die surface 54 of the removable die piece 50. This causes the shank 7 to flare outwardly, as is schematically depicted. Flaring of the shank 7 may be promoted by the pip 55 which projects from the rivet receiving die surface 54.

The nose 26 continues to clamp the workpiece 24 to the housing 30 of the die assembly 10 during this second rivet insertion step. As a result of the second rivet insertion step, and as depicted in FIG. 7, a bottom end of the shank 7 flares outwardly and forms an interlock with the lower layer 62 of the workpiece. In addition, the head 9 is pressed into the upper layer 60 of the workpiece and forms an interlock with the upper layer. Thus, the rivet 3 forms a joint in the workpiece 24 with interlock to the upper layer 60 and lower layer 62 of the workpiece.

A benefit of cutting an outwardly tapering hole in the workpiece is that during the swaging step there is space available for the rivet shank 7 to deform into without the rivet shank being required to push workpiece material outwards. This may be advantageous for example if the workpiece comprises a lowermost sheet which has low ductility (e.g. UHSS, magnesium, 7000 series aluminium, cast aluminium, or carbon fibre), because it may be difficult for the rivet shank to push a low ductility sheet outwards without causing damage to the sheet or to the rivet.

It will be noted that the nose 26 of the rivet insertion apparatus clamps the workpiece 24 between the nose and the outer die portion 34 formed by the housing 30 throughout the above described rivet insertion process. That is, the nose 26 clamps the workpiece 24 to the housing 30 before the first rivet insertion step (the piercing step) and remains in place until after the second rivet insertion step (the swaging step) has been completed. This ensures that the workpiece 24 and rivet 5 remain aligned with the punch 3 and die 37 throughout the rivet insertion process. If the nose were to be released after the piercing step then it would be difficult to ensure alignment of the punch 3 and die 37 for the swaging step. In addition, the layers 60, 62 of the workpiece 24 may spring apart because there is no interlock between the shank of the rivet and the lowermost workpiece layer 62. The clamping also prevents or minimises bending of the workpiece 24 during the rivet insertion process.

Figure 8:
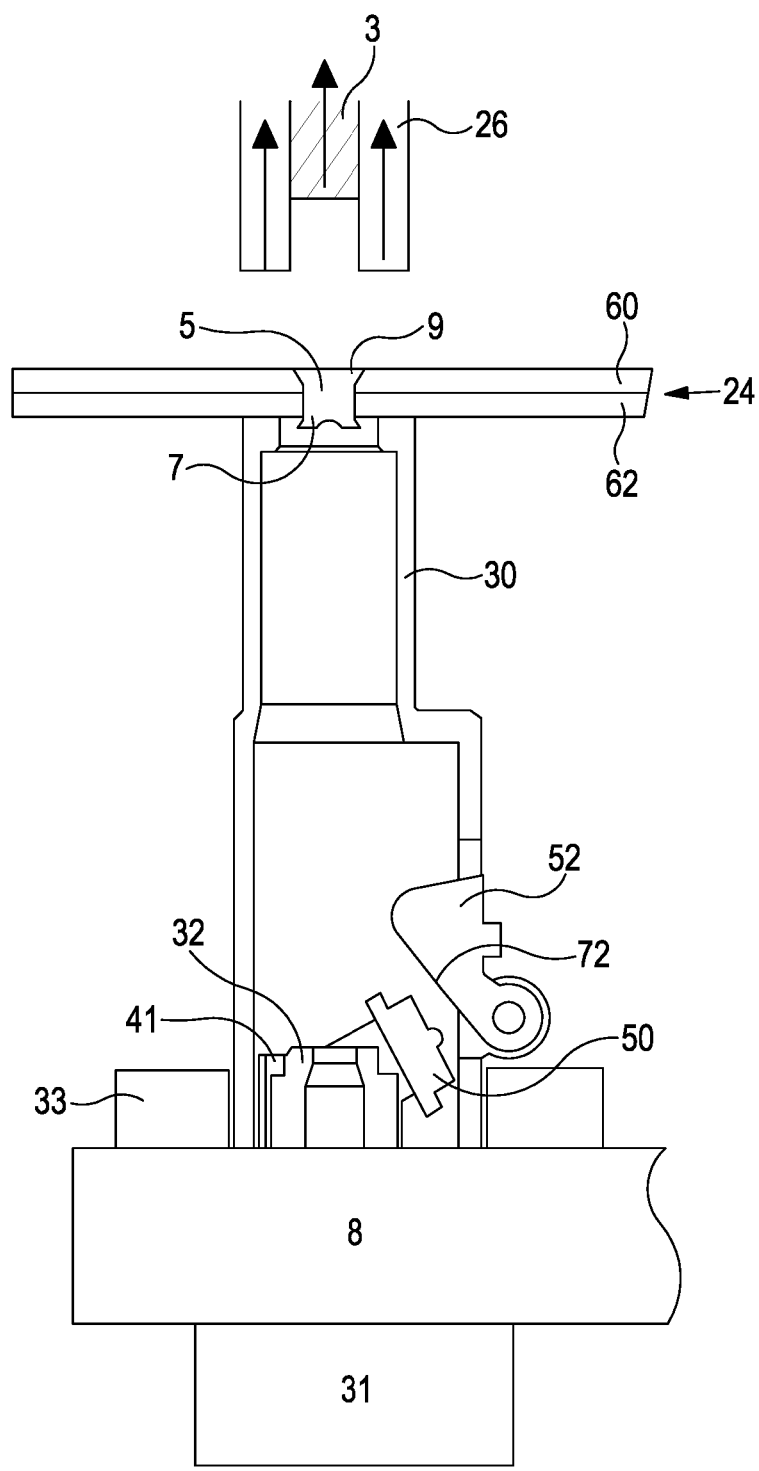
FIG. 8 is the same cross-sectional view as FIG. 7, but shows retraction of the nose and modifying the die.
Figure 9:
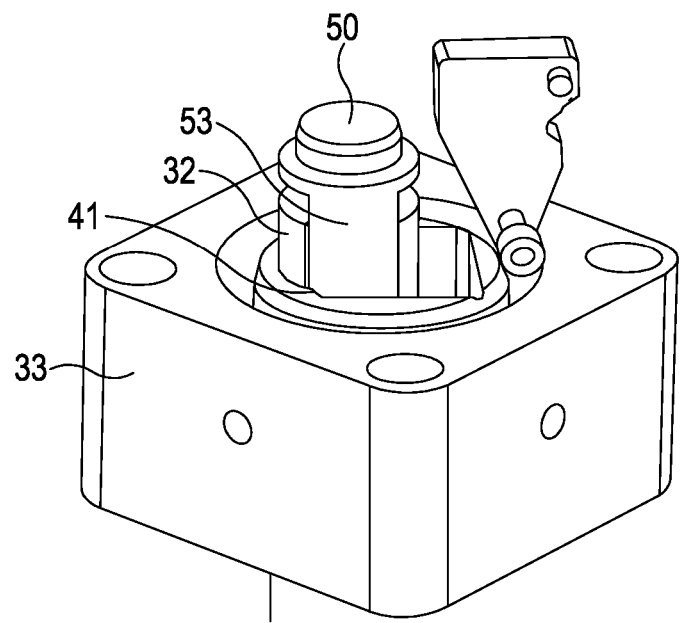
FIGS. 9 and 10 are perspective views of part of the die assembly which depict modifying the die in more detail.
Figure 10:
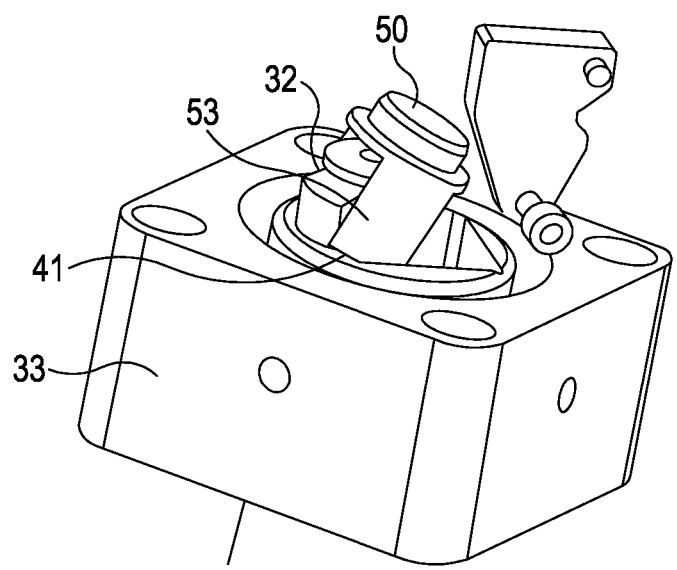

Referring to FIG. 8, the punch 3 is retracted within the nose 26, and the nose 26 is retracted from the workpiece 24. The rod 32 is retracted within the housing 30 and away from the workpiece 24. FIGS. 9 and 10 depict in perspective view how the removable die piece 50 is removed from the end of the rod 32. Referring first to FIG. 9, as the rod 32 is retracted a bottom corner portion of the arm 53 comes into contact with a cam surface 41. The cam surface may also be seen in FIG. 8. The cam surface may for example form part of the housing 30 or part of the base 33. The cam surface 41 pushes against the bottom corner portion of the arm 53. A corresponding cam surface may push against a bottom corner portion of the other arm (not visible) of the removable die piece 50. As depicted in FIG. 10, the cam surfaces pushing against the bottom corner portions of the arms 53 causes the removable die piece 50 to pivot about pins (not visible). This returns the removable die piece 50 to its original position at the side of the rod 32.

The rod 32 may subsequently be moved upwards towards the top of the housing 30, in order to return the rod to the position depicted in FIG. 2. The pivoting arm 52 may be resiliently biased, e.g. by a spring such as a torsion spring (not depicted) such that the pivoting arm presses against the rod 32. During the upward movement of the rod 32 the pivoting arm 52 is pushed aside by the removable die piece 50 via engagement with a cam surface 72 of the pivoting arm. The resilient bias applied to the pivoting arm 52 moves the pivoting arm back into engagement with the rod 32 once the removable die piece 59 has moved beyond the pivoting arm. The rod 32 and removable die piece 50 are thus returned to the configuration depicted in FIG. 2. The rivet insertion apparatus 2 may then be used to insert another rivet into the workpiece 24 or into a different workpiece. In an alternative arrangement a stop may be provided which limits rotational movement of the pivoting arm 52 such that it does not come into engagement with the rod 32.

The actuator 31 is not depicted in detail in FIGS. 2-6. Any suitable actuator may be used, for example an actuator as depicted in U.S. Pat. No. 9,387,557, which is herein incorporated by reference.

An advantage of the present invention compared with the prior art is that there is no requirement to provide an actuator on the die-side of the rivet insertion apparatus 2 which is capable of exerting sufficient force to deform the shank 7 of the rivet 3. The force needed to deform the shank 7 of the rivet may be tens of kN (e.g. 70 kN or more). Instead, all that is required is an actuator which provides sufficient force to move the rod 32 (e.g. a few kN or less). A lock (described above) holds the rod 32 in place. The lock is sufficiently strong to withstand the force needed to deform the shank 7 of the rivet. The force which deforms the shank 7 of the rivet 5 is applied using the punch 3 which is driven by the drive 12. Thus, the drive 12 which drives the punch 3 is used for both the initial rivet insertion step (which may be referred to as the piercing step) and subsequent rivet shank flaring step (which may be referred to as the swaging step). This is instead of using a drive on the rivet side for the piercing step and a drive on the die side for the swaging step.

If a drive capable of providing rivet deformation forces were to be located on the die side of the apparatus then this would occupy a significant volume. For example, the volume occupied would be similar to the volume occupied by the housing 14 and electric drive 12 depicted in FIG. 1. As will be appreciated, having such a large drive apparatus on the die side in addition to having such a drive apparatus on the opposite side, would create a very bulky apparatus. Such a bulky apparatus would be difficult to manipulate and would be unable to access workpiece locations in tight volumes (e.g. in parts of vehicles which are difficult to access). This potential problem is avoided by embodiments of the invention because the drive 12 on the rivet side is used for the piercing step and the subsequent swaging step.

It might be possible to use a hydraulic actuator to provide the rivet swaging force. Hydraulic actuators are relatively compact, and may occupy less volume than an electric drive. However, it is preferable not to use a hydraulic actuator because it may be difficult to deliver hydraulic fluid, and because there are health and safety concerns associated with hydraulic fluid.

A further advantage of embodiments of the invention is that because only a single drive capable of exerting rivet deforming forces is used, the cost of the apparatus is low (compared with an apparatus in which drives capable of exerting rivet deformation forces are provided on the rivet side and on the die side). A further advantage is that the total weight of the rivet insertion apparatus is reduced (drives capable of exerting rivet deforming forces are heavy). This advantageously allows easier manipulation of the rivet insertion apparatus using a robot arm.

If an attempt were made to perform the swaging step by applying force to the bottom end of the shank 7 of the rivet 5, then there is a risk that this would push the rivet upwards and out of the workpiece. This risk is avoided by embodiments of the invention.

Referring again to FIG. 3, following the first rivet insertion step the head 9 of the rivet 3 stands proud of an upper surface of the workpiece 24. A lowermost end of the shank 7 is flush (or substantially flush) with a lowermost surface of the workpiece 24. This position of the rivet after the first rivet insertion step (which may be referred to as the piercing step) is desirable because it allows further downward movement of the rivet to take place during the second rivet insertion step (which may be referred to as the swaging step). This downward movement of the rivet 3 during the swaging step is needed in order to deform the shank of the rivet against the removable die piece 50.

When a rivet is inserted into a workpiece, the force which is required for the insertion increases gradually as a function of the insertion depth of the rivet in the workpiece. In particular, as the rivet head is inserted into the workpiece additional force is needed. This is because the surface area of the head is significant and this area needs to be pressed into the upper layer of the workpiece. Since the force required to insert the rivet increases as a function of rivet insertion depth, the depth to which the rivet is inserted may be controlled via selection of the force is applied to the rivet during the piercing step. The force may be selected for example based upon calculations which take into account the tensile strength of the layers of the workpiece (particularly the UHSS upper layer 60), the thickness of the workpiece layers, and properties of the rivet. Additionally or alternatively, trial rivet insertions may be used to determine a desirable rivet insertion force to be used. If an inertial drive is used to drive the rivet into the workpiece, then the force applied to the punch is predetermined and cannot be changed once the piercing step has begun. Thus, it may be advantageous to determine the force which will be applied during the piercing step before that step takes place.

In an alternative example, the force which is applied to the punch 3 may be applied directly (e.g. by an electric motor) during rivet insertion (i.e. without an inertial drive). Where this is the case, the force which is applied to the rivet may be controlled as a function of the position of the punch (and rivet) using a feedback loop. The feedback loop may for example receive position information from a position encoder or other position measurement apparatus. In this alternative approach, force which is being applied to the punch may be stopped when the punch and the rivet have reached a desired position (e.g. by switching off power to the electric motor). The desired position may be a desired position of the rivet at the end of the first rivet insertion step (the piercing step). Once the die has been modified (or changed) force may then be reapplied to the rivet until the rivet has advanced to a second desired position. The second desired position may be a desired position at the end of the second rivet insertion step (the swaging step). Application of force to the rivet by the punch may be controlled by the controller 23.

The geometry of the rivet 5 may be selected in order to help to ensure that the rivet does not travel to far into the workpiece 24 during the initial rivet insertion step (the piercing step). This ensures that further movement of the rivet 5 into the workpiece may take place during the second rivet insertion step (the swaging step).

In one example, the rivet 5 may be provided with a head 9 which has a chamfered lower surface. The chamfer may extend from an upper end of the shank 7 to an outer edge of the head 9 (as depicted in FIGS. 2-6). The angle of the chamfer may for example be in the range 20° to 60° relative to a line which is perpendicular to a central axis of the rivet. During rivet insertion, when a bottom end of the chamfer reaches the upper layer 60 of the workpiece 24, the force required to insert the rivet increases significantly. This significant increase of the force needed to move the rivet further into the workpiece 24 may exceed the force which is exerted by the rivet insertion apparatus 2 during the first rivet insertion step (the piercing step), and as a result the rivet will stop moving into the workpiece.

In an alternative geometry, instead of a chamfer the rivet may be provided with a radiused connection between the shank 7 and the head 9. The radius of curvature may be sufficiently large (e.g. at least 1.5 mm) that the force needed to continue to push the rivet into the workpiece 24 increases significantly. Again, this may stop further movement of the rivet into the workpiece, when the force needed to move the rivet exceeds the force which is exerted by the rivet insertion apparatus 2 during the first rivet insertion step.

Other forms of rivet head may be used.

The force needed insert the rivet shank into the workpiece may for example be in the range 10-45 kN. The force needed to insert the rivet head into the workpiece and swage the rivet shank may for example be in the range 30-80 kN.

In the embodiment depicted in FIGS. 2-6 the rivet 5 is provided with a recess (not depicted) at its bottom end. In one embodiment the recess may be conical (e.g. subtending an included angle of 90°), although in other embodiments the recess may have some other shape. In one embodiment the recess may have a depth of 1.7 mm, although in other embodiments the recess may have some other depth (e.g. less than 1.7 mm). The rivet 5 may for example have a flat foot which surrounds the recess at the bottom end of the shank 7. The rivet may for example be at least 5 mm long, and may for example have a length of up to 10 mm or more. Examples of rivet geometries are discussed further below.

As noted above, it may be desirable to provide the rivet 3 with a chamfered head because a head of this type may prevent the rivet travelling too far into the upper layer 60 of the workpiece 24 during the first rivet insertion step (the piercing step). This may work well for example for upper layers 60 of tensile strengths up to around 500 MPa. However, for materials having tensile strength in excess of 500 MPa it may be desirable not to provide a chamfered head because it may be very difficult to push this head into the UHSS layer such that it becomes flush with that layer. Where this is the case, a radius may be provided beneath the head which is sufficiently small to allow the shank and radiused portion to be fully inserted into the UHSS layer using forces which are not excessive (e.g. up to 80 kN). Such rivets may be referred to "pan" or "flat" headed rivets. When such geometries are used, the rivet head will remain proud of the upper layer 60 of the workpiece 24 after rivet insertion has been completed. A lowermost surface of the rivet head may be in contact with an upper surface of the workpiece 24 (contact between the lowermost surface of the rivet head and the workpiece is desirable).

In general, the design of the underneath of the rivet head may be selected such that the piercing step does not fully insert the rivet into the workpiece, such that when the swaging step takes place further movement of the rivet into the workpiece may occur.

Rivets which may be used in connection with the invention are depicted in FIGS. 7-10. Other forms of rivet, such as a rivet with a chamfered connection between the shank and the head may be used.

Figure 11A:
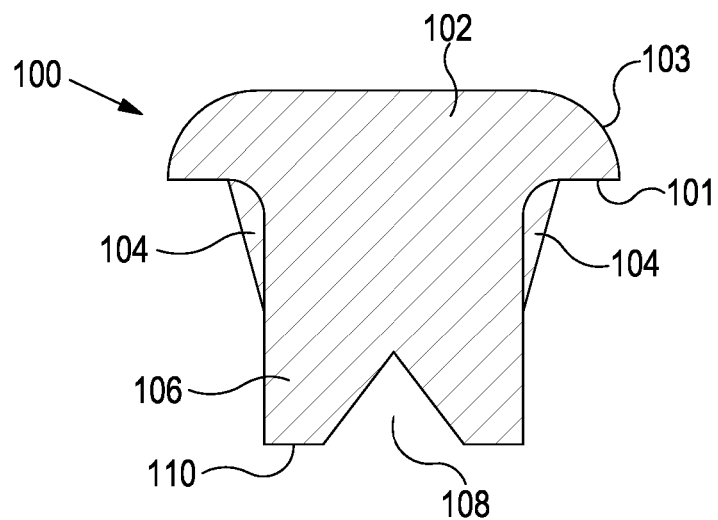
FIGS. 11A-C depict a rivet according to an embodiment of the invention.
Figure 11B:
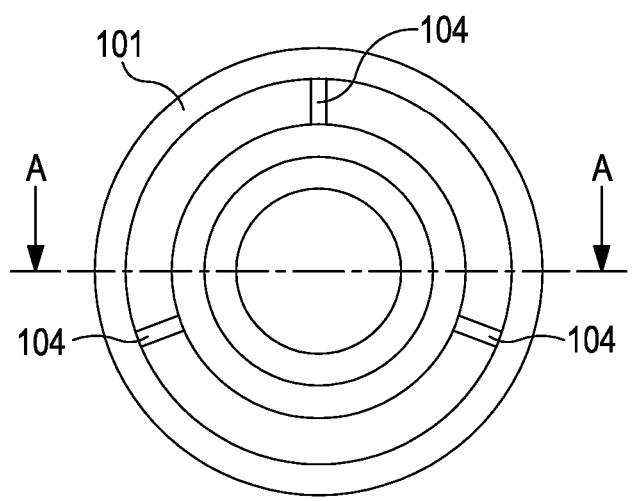

Referring first to FIGS. 11A and 11B, a pan-head rivet may be used. This rivet 100 has a head 102 with a flat lowermost surface 101 but a curved uppermost surface 103. The rivet head 102 is intended to stand proud of the workpiece when rivet insertion has been completed. Three ribs 104 extend from partway up a shank 106 of the rivet, and taper outwardly before meeting an underside of the head 102 of the rivet. The ribs are circumferentially separated from each other by 120 degrees. A recess 108 is provided at the bottom of the shank 106. The recess in this instance is conical in shape but may have some other form. A flat foot 110 is provided at a lowermost end of the shank 106. In use, when the rivet 100 is inserted into a workpiece, the flat foot 100 penetrates the workpiece 24 and travels into the lower layer 62 of the workpiece. When the ribs 104 are incident at the upper layer 60 (which may be a UHSS layer), significant additional force is needed to cause the rivet to move further. This is because significant force is needed to push the ribs 104 into the upper layer 60. This significant extra force may exceed the force applied by the punch 3, and consequently the rivet may stop moving into the workpiece 24. During the subsequent swaging step, sufficient force may be applied to the rivet to drive the ribs 104 into the upper layer of the workpiece, and to flare the shank of the rivet against the die. As discussed elsewhere, because the rivet includes a recess 108, flaring of the rivet will take place if no pip is present on the die. A die with a pip may be used if desired.

A rib 104 is depicted in cross-section in FIG. 110. The rib 104 may for example have tapered sides (tapered sides are more easy to form using forging than sides which are at 90° relative to an outer edge of the rib). The thickness of the ribs 104 may be selected based upon a desired threshold force level (i.e. a level of force which should be exceeded in order to push the ribs into a workpiece). The selection may take into account the tensile strength of an upper layer of the workpiece. In an embodiment, the ribs may have a thickness of around 1 mm.

The length of the ribs 104 may be selected based upon a desired penetration of the rivet into the workpiece during the first rivet insertion step. In an embodiment, the ribs 104 may be around 2 mm long (measured in an axial direction of the rivet 100).

A different number of ribs may be provided. For example, four or more ribs may be provided.

Figure 11C:

Although the rivet depicted in FIG. 11 has a flat foot 110, other foot geometries may be used. The foot geometry may be selected such that no flaring or negligible flaring of the shank occurs when it passes through the upper layer 60 (which may be a UHSS layer) of the workpiece 24. For example an inwardly tapering foot may not be preferred when joining an UHSS top sheet as this may cause premature flaring. However, in other embodiments (e.g. if the upper layer of the workpiece is less hard than UHSS), then such a rivet with an inwardly tapering foot may be used. This is beneficial as it will assist in providing maximum interlock with a lower layer of the workpiece after the swaging operation.

An outer edge of the shank (which may be referred to as the tip) may be rounded. Rounding of the tip may provide some control over the degree to which the rivet shank flares during the first rivet insertion step (the piercing step). A larger radius of curvature at the tip will reduce rivet shank flaring, whereas a smaller radius of curvature at the tip will increase rivet shank flaring. The rounded tip 16 may have a radius of curvature which is at least 0.05 mm. It may be difficult to provide a radius of curvature below 0.05 mm when using conventional rivet fabrication techniques. The radius of curvature may for example be up to 0.3 mm. The radius of curvature may be greater than 0.3 mm. However, if the radius of curvature is too large then this may reduce the ability of the rivet to cut through the upper layer 60 of a workpiece.

Although the cavity 108 is conical, other geometries of cavity may be used.

Figure 12:
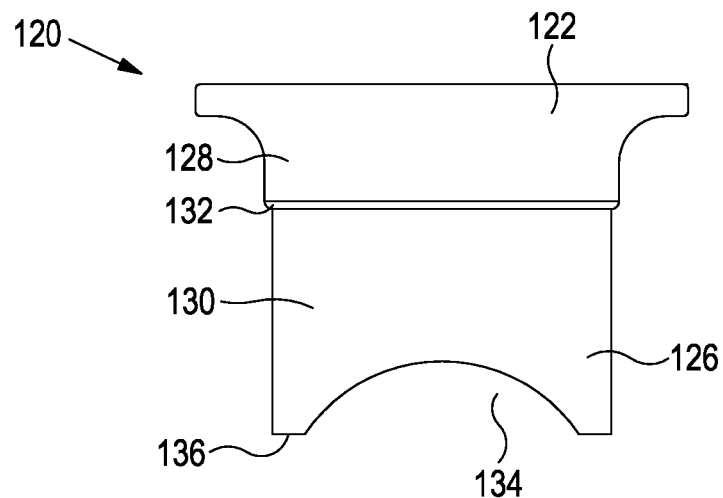
FIG. 12 depicts a rivet according to a further embodiment of the invention.

An alternative rivet is depicted in FIG. 12. This rivet 120 comprises a head 122 and a shank 126. The shank comprises an upper portion 128 and the lower portion 130. The upper portion 128 has a larger diameter than the lower portion 130. A chamfered transition 132 extends between the upper portion 128 and the lower portion 130. In an alternative arrangement the transition may for example be rounded. The rivet head 122 has a flat upper surface. The rivet head 122 is intended to sit proud of a workpiece when a joint has been completed. A lowermost surface of the rivet head may be in contact with an upper surface of a workpiece when a joint is formed (contact between the lowermost surface of the rivet head and the workpiece is desirable). A flat foot 136 is provided at a lowermost end of the shank 130. A recess 134 is provided at the lowermost end of the shank 130.

The transition 132 is positioned at a point on the rivet shaft at which it is desired to stop further movement of the rivet into a workpiece during a first rivet insertion step. The recess has a depth which is less than the length of the lower portion of the rivet shank. The depth of the recess may be less than half of the length of the lower portion of the rivet shank. Having a relatively shallow recess (compared with a conventional rivet) is advantageous because it provides a stronger rivet shank.

During rivet insertion, the lower portion 130 of the shank 126 penetrates the workpiece 24 during the first rivet insertion stage. When the chamfered transition 132 comes into contact with the workpiece, the force needed to continue to push the rivet into the workpiece increases significantly. This force may be larger than the force being applied to the rivet by the punch 3, in which case movement of the rivet into the workpiece will stop. During the second rivet insertion step (the swaging step) additional force is applied to the rivet 120, such that the chamfered transition 132 and the upper portion of the shank 128 are driven into the workpiece 24. At the same time, the shank 126 comes into contact with the die and flares outwardly. The die does not require a pip because the recess 134 is provided in the shank. However, a die provided with a pip may be used.

If some flaring of the lower shank portion 130 occurs as the rivet cuts into the upper layer 60 of the workpiece 24, then the hole cut in the upper layer will be larger than the unflared diameter of the rivet shank lower portion. The larger diameter rivet shank upper portion 128 may advantageously fill that larger diameter hole. This may provide a joint which is more resistant to fatigue than would be the case if a gap were present between the rivet and the upper layer 60 of the workpiece 24. The diameter of the rivet shank upper portion 128 is bigger than the hole cut by the lower portion, so that an increase of force is needed to push the upper portion into the hole The diameter of the upper shank portion 128 may for example be between 1 and 12% greater than the diameter of the lower shank portion 130 (measured prior to insertion of the rivet into a workpiece). The difference between the diameter of the upper shank portion 128 and the diameter of the lower shank portion 130 may be selected based upon a desired threshold force level (i.e. a level of force which should be exceeded in order to push the upper shank portion into a workpiece). The selection may take into account the tensile strength of an upper layer of the workpiece. Although the transition 132 of the depicted embodiment is chamfered, other forms of transition such as a curved transition may be used. Although the rivet depicted in FIG. 12 has a flat foot 136, other foot geometries may be used. However, a flat foot provides the rivet with the greatest column strength and thus a flat foot may be preferred. Although the cavity 134 is dome shaped, the cavity may have some other geometry.

Figure 13:
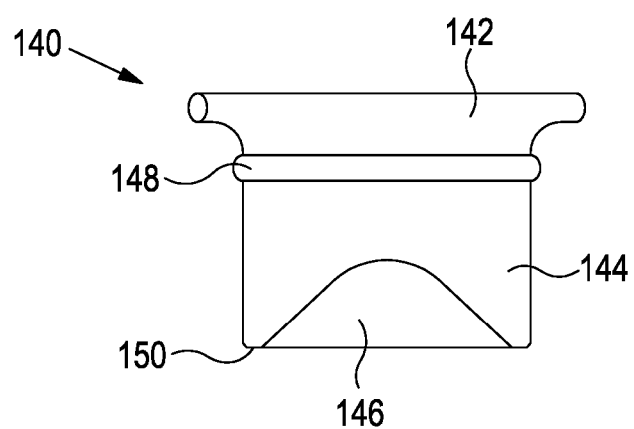
FIG. 13 depicts a rivet according to a further embodiment of the invention.

A rivet according to a further embodiment is depicted in FIG. 13. The rivet 140 comprises a head 142 and a shank 144. The rivet head 142 has a flat uppermost surface, and is intended to sit proud of a workpiece when a joint has been completed. A lowermost surface of the rivet head 142 may be in contact with an upper surface of a workpiece when a joint is formed (contact between the lowermost surface of the rivet head and the workpiece is desirable). A ridge 148 extends circumferentially around the shank 144. In this embodiment the ridge 148 is adjacent to the head 142, but the ridge may be provided at some other position on the shank 144 (the position may be selected based upon the depth of rivet insertion that is desired for the first rivet insertion step). The ridge 148 has a curved outer surface, and may for example have a radius of curvature of around 1 mm (although some other radius of curvature may be used. A flat foot 150 is provided at a lowermost end of the shank 144. A recess 146 is provided at the lowermost end of the shank 144. The recess has a conical outer portion and a dome shaped inner portion. In other embodiments the recess may have some other shape.

During rivet insertion, the shank 144 penetrates the workpiece 24 during the first rivet insertion stage. When the ridge 148 comes into contact with the workpiece, the force needed to continue to push the rivet into the workpiece increases significantly. This force may be larger than the force being applied to the rivet by the punch 3, in which case movement of the rivet into the workpiece will stop. During the second rivet insertion step (the swaging step) additional force is applied to the rivet 140, such that the ridge 148 and the remainder of the shank 144 are driven into the workpiece 24. At the same time, the shank 144 comes into contact with the die and flares outwardly. The die does not require a pip because the recess 146 is provided in the shank. However, a die provided with a pip may be used.

The difference between an outer diameter of the ridge 148 and the diameter of the shank 144 may be selected based upon a desired threshold force level (i.e. a level of force which should be exceeded in order to push the upper shank portion into a workpiece). The outer diameter of the ridge 148 may for example be between 1 and 12% greater than the diameter of the shank 144 (measured prior to insertion of the rivet into a workpiece). The selection may take into account the tensile strength of an upper layer of the workpiece or the thickness of the upper layer of the workpiece (thinner material is more easily deformed). A smaller ridge may be used for a higher strength upper layer of the workpiece or a thinner upper layer of the workpiece, and a larger ridge may be used for a lower strength upper layer of the workpiece or thicker upper layer of the workpiece. Although the ridge 148 has a rounded surface, the ridge may have some other shape. Although the rivet depicted in FIG. 13 has a flat foot 150, other foot geometries may be used. However, a flat foot provides the rivet with the greatest column strength and thus a flat foot may be preferred. Although the cavity 134 is conical and dome shaped, the cavity may have some other geometry.

The depth of the recess 146 may be less than half of the distance from the ridge 148 to the foot 150 of the rivet. Having a relatively shallow recess (compared with a conventional rivet) is advantageous because it provides a stronger rivet shank.

Figure 14:
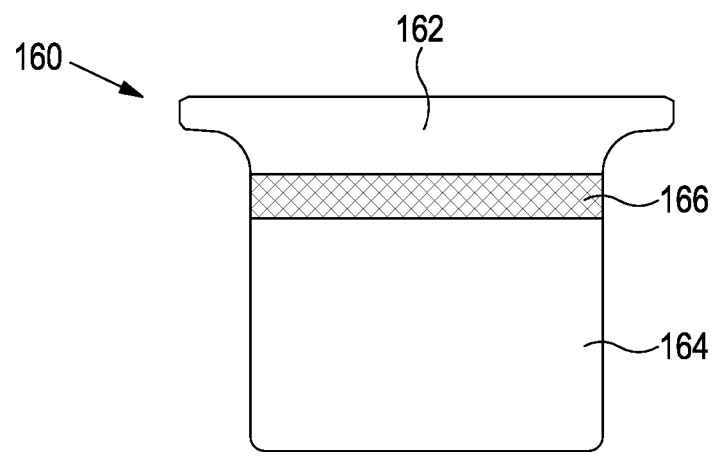
FIG. 14 depicts a rivet according to a further embodiment of the invention.

A rivet according to a further embodiment is depicted in FIG. 14. The rivet 160 comprises a head 162 and a shank 164. The rivet head 162 again has a flat uppermost surface, and is intended to sit proud of a workpiece when a joint has been completed. A lowermost surface of the rivet head 162 may be in contact with an upper surface of a workpiece when a joint is formed (contact between the lowermost surface of the rivet head and the workpiece is desirable). and may lie flush with an uppermost surface of the workpiece 24 when the rivet insertion has been completed. Unlike the rivets depicted in FIG. 11-9, no recess is provided at the bottom of the shank 164. Thus, as discussed elsewhere, a die which includes a pip may be needed in order to promote flaring of the shank 164 during the swaging step. A knurled band 166 extends around the rivet shank 164. The knurled band 166 is adjacent to the head 162 of the rivet 160, but could be provided at some other position on the shank 164.

The knurled band 166 may for example be formed after the rivet had been forged, by transferring the rivet to a rolling machine which knurls the band at a selected position on the rivet shank 164.

During rivet insertion, the shank 164 penetrates the workpiece 24 during the first rivet insertion step. When the knurled band 166 reaches the workpiece, friction between the knurled band 166 and the workpiece significantly increases the force needed in order for the rivet to continue to penetrate into the workpiece 24. The force may be greater than the force being applied by the punch 3, in which case movement of the rivet into the workpiece will stop. During the second rivet insertion step (the swaging step) additional force is applied to the rivet 160 by the punch 3. This additional force is sufficient to overcome the friction between the knurled band 166 and the workpiece, and thus the rivet penetrates further into the workpiece. The shank 164 is pressed against a die (e.g. with a pip) and flares outwardly.

The position of the knurled band 166 on the shank 164 may be selected based upon the depth of rivet insertion that is desired for the first rivet insertion step.

In the depicted embodiment no recess is provided in the shank 164. However, in other embodiments a recess may be provided. The depth of the recess may be less than half of the distance from the knurled band 166 to a foot of the rivet. Having a relatively shallow recess (compared with a conventional rivet) is advantageous because it provides a stronger rivet shank.

Different features of the rivets depicted in FIGS. 7-10 may be combined together.

Rivets according to embodiments of the invention may for example have a head diameter of around 7.75 mm (thereby allowing them to be handled using conventional rivet handling systems). In other embodiments the rivets may have some other head diameter (e.g. a head diameter of less than 7.75 mm).

Rivets according to embodiments of the invention may have a recess extending upwards from the bottom of the shank. In general, making the recess shallower will provide a stronger rivet shank, but will make it more difficult to cause the shank to flare. Embodiments of the invention may have a recess with a depth which is less than 2 mm. In some embodiments the shank may be provided with no recess.

Rivets according to an embodiment of the invention may have a shank which has a diameter, measured at a bottom end of the shank, of at least 5 mm (e.g. around 5.1 mm+/−0.1 mm). Rivets according to an embodiment of the invention may have a shank which has a diameter, measured at a bottom end of the shank, of up to 6 mm.

In this document the term UHSS may be considered to mean steel with a tensile strength of 800 MPa or more. UHSS may have a tensile strength of 1000 MPa or more, and may have a tensile strength of up to 2000 MPa. Typical UHSS may have example have a tensile strength of around 1500 MPa (e.g. plus or minus 100 MPa).

This document refers at various times to upwards movement and downwards movement, top surfaces and bottom surfaces, etc. These terms are used in the context of the orientation of the apparatus and rivet depicted in the Figures. It will be appreciated that in practice apparatus and rivets according to embodiments may have any orientation. The terms that are used may be interpreted in the context of a reference frame defined by the apparatus.

Although a specific apparatus is depicted and described for switching between the die used during the piercing step and the die used during the swaging step, other apparatus may be used.

In the depicted embodiment the nose 26 of the rivet insertion tool clamps the workpiece 24 to the outer portion 34 of the die 37. However, it is not necessary that the nose clamps the workpiece to part of a die. For example, in an alternative arrangement the nose may clamp the workpiece to a housing which surrounds the dies. In general, the nose may clamp the workpiece to part of a die assembly.

Prior art methods of joining a workpiece that comprises a UHSS sheet frequently require the use of rivets having a hardness of 530 HV or more. However, when using an embodiment of the invention a softer rivet may be used. Prior art rivets typically require a deeper bore than rivets used in accordance with embodiments of the invention (the deeper bore being required in the prior art in order to achieve sufficient rivet flaring). This deeper bore reduces the column strength of the rivet, and thus a harder rivet material is needed to compensate for the strength reduction. In embodiments of the invention the rivet may have a shallower recess, e.g. up to 40% of the length of the rivet (or no recess) and hence has greater column strength. As a result, the rivet may be formed from a softer material. For example, a rivet with a hardness of less than 530 HV may be used. For example, a rivet with a hardness of between 450 HV and 510 HV may be used, e.g. when forming a joint in a workpiece which comprises UHSS (e.g. UHSS with a tensile strength of 1200 MPa and a thickness of 1.5 mm). Using a rivet with a lower hardness than is conventionally used is advantageous because rivets with lower hardness can be more easily flared and are less likely to fracture. In other embodiments, a rivet with a hardness of 510 HV or more may be used (e.g. a rivet with hardness of 530 HV or more).

An advantage of the invention is that it is capable of forming a joint in a workpiece in which the lower sheet of material exhibits very low ductility (e.g. magnesium, 7000 series aluminium, cast aluminium or carbon fibre). Conventional self-piercing riveting methods are not capable of forming a joint in such a workpiece. However, embodiments of the invention are able to accommodate flaring of the rivet. Referring to FIG. 8 for example, the shank 7 of the rivet 5 is flared beneath the workpiece 24. The rivet shank 7 did not need to displace workpiece material outwardly when flaring, because it flared beneath the workpiece. Therefore, problems arising from pushing workpiece material outwardly are avoided. Another way in which embodiments of the invention are able to accommodate flaring of the rivet is by forming an outwardly tapering hole in the workpiece (as explained further above).

A further advantage of the invention is that it is capable of forming a joint in a workpiece which comprises more ductile materials such as 5000 series aluminium and low alloy steels. Thus, the invention is very versatile in the sense that it may be used to form joints in workpieces which include very low ductility material but may also be used to form joints in workpieces which do not include very low ductility material.

As noted further above, the rivet receiving die surface 54 may include a protrusion 55 (which may be referred to as a pip) at its centre, or may substantially flat (i.e. without a pip). A die may be selected which doesn't include a pip if sufficient flaring of the rivet shank 7 will occur without a pip being present. This may be the case for example if the hole cut into the workpiece 24 tapers outwardly, because the rivet shank 7 may be swaged outwardly very easily during the swaging step (little or no workpiece material needs to be pushed sideways by the rivet shank). If it is more difficult to achieve flaring of the rivet shank 7, for example if the hole in the workpiece includes little or no outward taper, then a die with a pip may be used to promote flaring of the rivet shank.

In an alternative embodiment (not depicted), instead of swapping between an inner die portion with a bore and an inner die portion without a bore, the entire die may be changed. That is, a die with a bore may be replaced with a die without a bore. Where this is the case the nose may clamp the workpiece to a housing or other part of the die assembly. One way in which a die may be replaced with a different die is by providing two dies on pivoting supports which allow one die or the other die to be moved into position. A lock may be provided which hold the dies in position and are capable of withstanding rivet insertion and rivet swaging forces.

The invention claimed is:

1. A method of inserting a rivet into a workpiece using a rivet insertion apparatus, the method comprising:
   during a first rivet insertion step, using a punch and die to drive the rivet into the workpiece such that a slug of workpiece material is removed from the workpiece and travels into a bore provided in the die;
   modifying or changing the die to provide a rivet receiving die surface; then
   during a second rivet insertion step, using the punch to drive the rivet further into the workpiece such that a shank of the rivet is upset by the rivet receiving die surface,
   wherein a bottom end of the shank of the rivet is flush with a lowermost surface of the workpiece before the second rivet insertion step.

2. The method of claim 1, wherein the workpiece is clamped to a die assembly by a nose of the rivet insertion apparatus throughout insertion of the rivet.

3. The method of claim 1, wherein changing the die comprises removing the die provided with the bore and replacing it with a die having the rivet receiving die surface.

4. The method of claim 1, wherein modifying the die comprises removing an inner portion of the die and replacing it with a die inner portion which includes the rivet receiving die surface.

5. The method of claim 1, wherein the rivet includes a feature partway along the shank of the rivet which increases engagement between the rivet and the workpiece such that force required to push the rivet into the workpiece increases when the feature comes into contact with the workpiece.

6. The method of claim 1, wherein the rivet insertion apparatus receives feedback indicating the position of the rivet, and stops applying force when the first rivet insertion step has inserted the rivet to a desired position.

7. A rivet insertion apparatus configured to perform the method of claim 1, wherein the rivet insertion apparatus includes a punch and die and an electric motor controlled by and using a feedback loop to apply a force to a rivet, wherein modifying or changing the die includes using a die changing apparatus to swap between a die which includes a bore and a die which has a rivet receiving surface, or includes using a die modifying apparatus to swap a die inner portion which comprises a die bore with a die inner portion which comprises a die receiving surface.

8. The rivet insertion apparatus of claim 7, wherein the die changing apparatus comprises two dies held on pivoting supports which allow one die or the other die to be moved into a rivet receiving position in the die assembly.

9. The rivet insertion apparatus of claim 7, wherein the die modifying apparatus comprises an axially moveable rod within which the die bore is provided, and further comprises a removable die piece which comprises the rivet receiving surface, the removable die piece being movable to and from a position at one end of the axially moveable rod.

10. The rivet insertion apparatus of claim 7, wherein the die assembly comprises a lock which is configured to hold the die or die inner portion in position.

11. The rivet insertion apparatus of claim 7, wherein the die assembly further comprises an electric actuator or pneumatic actuator configured to move the dies or the die inner portions.

12. A vehicle comprising a riveted joint formed using the rivet insertion apparatus of claim 7.

* * * * *